March 3, 1959
T. W. SELL
2,875,638
HAND CONTROL FOR BRAKE AND ACCELERATOR
Filed July 6, 1956
2 Sheets-Sheet 1
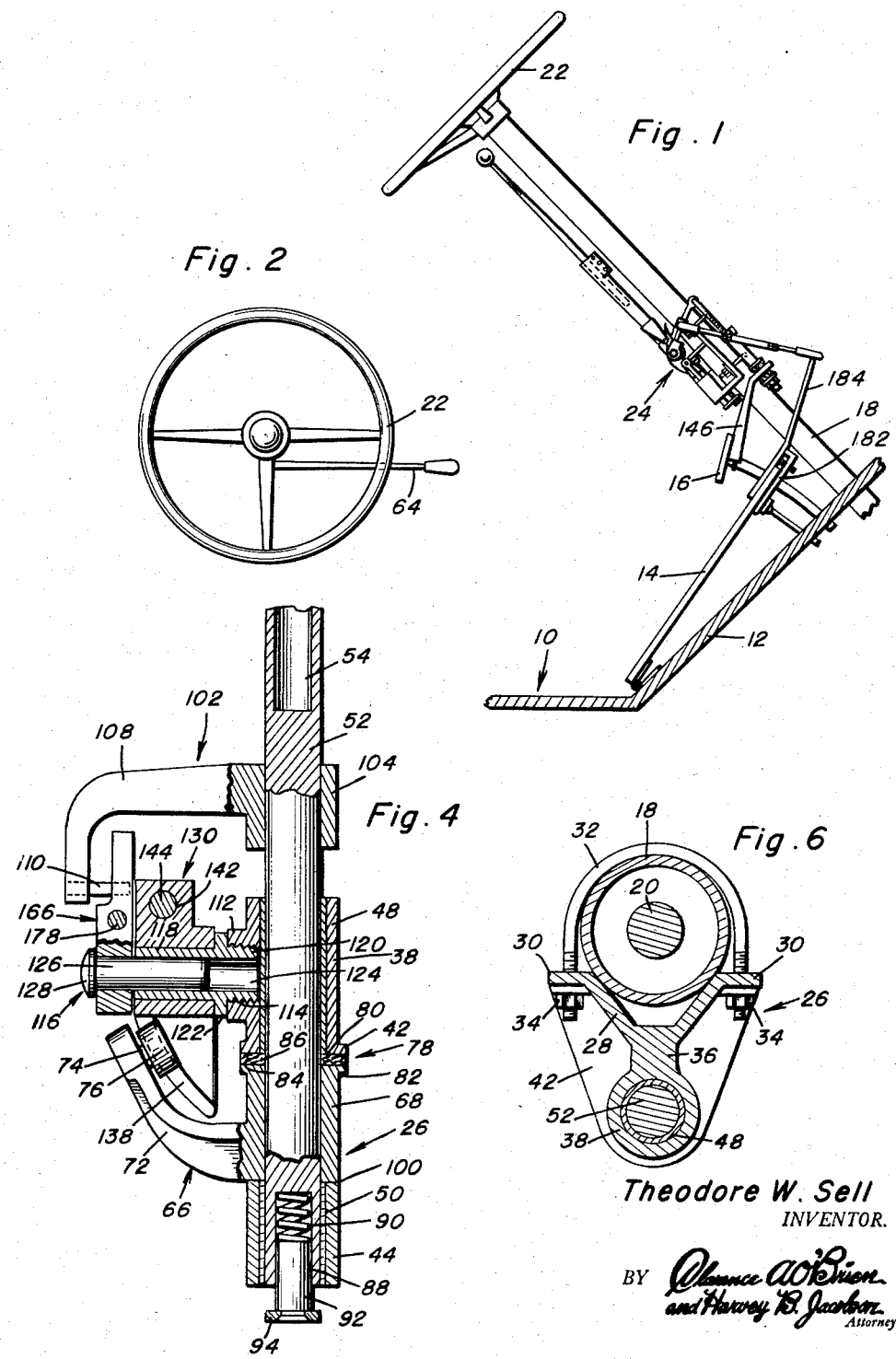
Theodore W. Sell
INVENTOR.

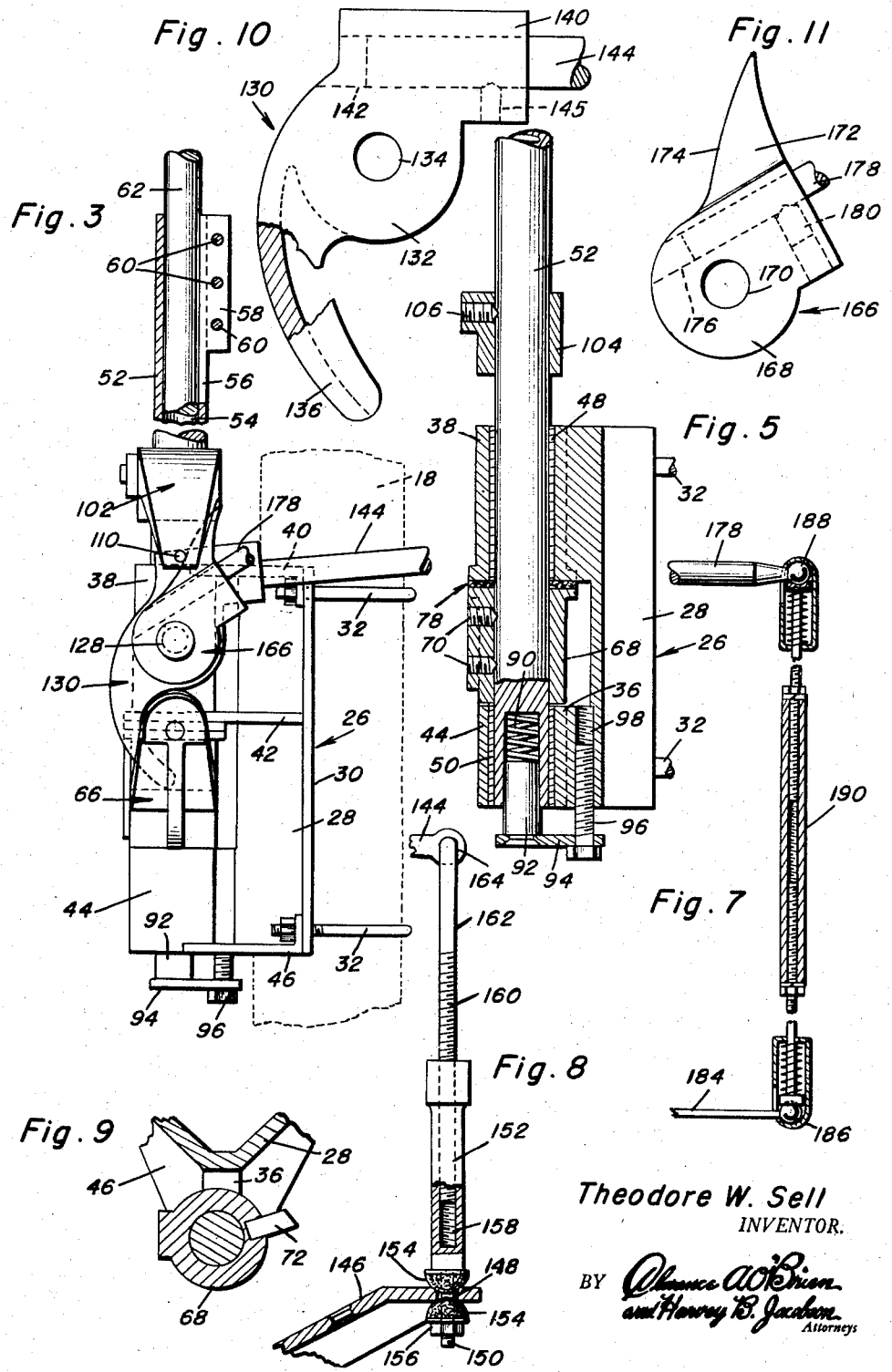

# United States Patent Office 2,875,638
Patented Mar. 3, 1959

2,875,638

HAND CONTROL FOR BRAKE AND ACCELERATOR

Theodore W. Sell, Fargo, N. Dak., assignor to Leverage Hand-Brake Company, Fargo, N. Dak., a corporation of North Dakota Application July 6, 1956, Serial No. 596,334

6 Claims. (Cl. 74—484)

This invention relates in general to new and useful improvements in control devices for automotive vehicles, and more specifically to a hand control for the brake and accelerator of an automobile.

Although automobiles with automatic transmissions require only the use of two pedals in the operation thereof, the accelerator pedal and the brake pedal, there are certain handicapped persons who do not have sufficient use of either leg to operate these two pedals. It is therefore the primary object of this invention to provide a control for operating selectively either the brake pedal or the accelerator pedal of an automobile the control being of such a nature whereby it may be manipulated by a single hand of the operator of the vehicle leaving the other hand free for steering.

Another object of this invention is to provide an improved control for the brake and accelerator of an automobile, the control being of such a nature whereby it may be operated by a single hand and requires only the movement of a handle in one direction for controlling the accelerator and the movement of the hand in the opposite direction for controlling the brake.

Still another object of this invention is to provide an improved hand control for brake and accelerator pedals of an automobile, the hand control being of an extremely simple nature and being so constructed whereby it may be readily mounted upon the steering column of the automobile and connected to the pedals thereof without any special adaptation of the automobile.

A further object of this invention is to provide a hand control for the brake and accelerator pedals of a vehicle, the control being of such a nature whereby it is retained in an adjusted position when controlling the operation of the accelerator pedal so that it may be released when driving extended distances and will retain the vehicle at the desired speed without constant manipulation of the control by the operator of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary sectional view taken through an automobile and shows attached to the steering column thereof the hand control which is the subject of this invention, the hand control being illustrated as being attached to the accelerator and brake pedal of the vehicle;

Figure 2 is a fragmentary plan view of the steering wheel of the vehicle of Figure 1 and shows the relationship of a control handle for the hand control with respect to the steering wheel;

Figure 3 is an enlarged side elevational view of the hand control of Figure 1 in a rotated position, the steering column being shown in dotted lines and an intermediate portion of the control shaft being broken away and shown in section in order to clearly illustrate the connection between the control shaft and the control handle of the control device;

Figure 4 is an enlarged fragmentary vertical sectional view taken through the lower part of the control device and shows the specific details thereof;

Figure 5 is an enlarged fragmentary sectional view taken substantially at right angles to the view of Figure 4 and shows further the details of the control device;

Figure 6 is an enlarged fragmentary transverse sectional view taken through an upper part of a mounting bracket of the control device and shows the specific relationship of the mounting bracket with respect to the steering column;

Figure 7 is an enlarged sectional view taken through a connecting link of the linkage for connecting the control device to the accelerator pedal;

Figure 8 is a fragmentary sectional view taken through an attaching bracket for the brake pedal and a link connecting the attaching bracket to the main part of the control device;

Figure 9 is an enlarged fragmentary transverse sectional view taken through the lower part of the control shaft and shows mounted thereon a cam follower;

Figure 10 is an enlarged elevational view of a cam for controlling the movement of the brake pedal and shows the specic details thereof, a portion of the cam being broken away and shown in section; and Figure 11 is an enlarged elevational view of the cam for controlling the accelerator pedal.

Referring now to the drawings in detail, it will be seen that there is illustrated in Figure 1 a fragmentary portion of an automobile of the type which employs an automatic transmission, the automobile being referred to in general by the reference numeral 10. The automobile 10 includes a floor board 12 which has positioned thereabove an accelerator pedal 14 and a brake pedal 16. The automobile 10 also includes a steering column 18 having mounted therein a steering shaft 20. Attached to the upper end of the steering shaft 20 is a steering wheel 22. Mounted on the steering column 18 is the hand control device which is the subject of this invention, the hand control device being referred to in general by the reference numeral 24.

The hand control device 24 includes a mounting bracket which is referred to in general by the reference numeral 26. As is best illustrated in Figures 3, 4 and 6, the mounting bracket 26 includes a generally V-shaped cross-sectional, vertically extending portion 28 which receives the steering column 18. The portion 28 is provided with coextensive wing flanges 30 which receive vertically spaced U-bolts 32. The U-bolts 32 are provided with nuts 34 which facilitate the clamping of the mounting bracket 26 to the steering column 18.

The mounting bracket 26 also includes a vertically extending web 36 which is formed integral with the V-shaped portion 28. The web 36 has formed integral with the upper part thereof an upper sleeve 38 which is reinforced at the upper and lower ends thereof by gussets 40 and 42, respectively. The gusset 42 is more extensive than the gusset 40 and forms a suitable shoulder, as is best illustrated in Figure 4.

Also formed integral with the web 36 is a lower sleeve 44. The lower sleeve 44 is aligned with the sleeve 38, but spaced therefrom. The lower end of the lower sleeve 44 is reinforced by a suitable gusset 46, as is best illustrated in Figure 3.

The upper sleeve 38 is provided with a suitable bushing 48. The lower sleeve 44 is provided with a similar bushing 50. Journaled in the bushings 48 and 50 are lower portions of a control shaft 52. The upper end of the control shaft 52 is tubular and includes a bore 54, as is best illustrated in Figure 3. The extreme upper end of the control shaft 52 is provided with a longitudinal split 56 and clamping flanges 58 having fasteners 60 passed therethrough. Telescoped within the bore 56 and clamped to the control shaft 52 by means of the flanges 58 is a vertical portion 62 of a control handle 64. The control handle 64 is adjusted with respect to the control shaft 52 to extend relative to the steering wheel 22 in the general position illustrated in Figure 2. It is understood that the position of the control handle 64 may be varied to suit the requirements of the particular drive.

The control shaft 52 is vertically positioned within the mounting bracket 26 for limited vertical movement by means of a first follower assembly which is referred to in general by the reference numeral 66. The follower assembly 66 includes a mounting sleeve 68 which is positioned on the control shaft 52 intermediate the sleeves 38 and 44 by means of setscrews 70 which are best illustrated in Figure 5. The follower assembly 66 also includes an outwardly and upwardly extending arm 72 which carries a shaft 74 on which there is mounted a roller 76.

Referring now to Figures 4 and 5 in particular, it will be seen that the control device 24 includes a clutch which is referred to in general by the reference numeral 78. The clutch 78 includes an upper clutch face 80 formed on the lower end of the upper sleeve 38. The upper end of the mounting sleeve 68 is provided with a shoulder 82 and the extreme upper end of the mounting sleeve 68 is in the form of a lower clutch face 84. Disposed between the clutch faces 80 and 84 is a friction clutch disk 86.

The lower end of the control shaft 52 is provided with a bore 88 which opens through the lower end thereof. Disposed in the upper part of the bore 88 is a spring 90 which bears against the pin 92 partially telescoped within the bore 88. The pin 92 is carried by a plate 94 which is retained in an adjusted position by means of a fastener 96 which is adjustably threadedly engaged in an internally threaded bore 98 in the web 36. It will be seen that the spring 90 normally urges the lower clutch face 84 towards the upper clutch face 80 to clamp the clutch disk 86 therebetween thus retaining the control shaft 52 in an adjusted rotated position. The lower end of the mounting sleeve 68 terminates above the lower sleeve 44 so as to provide a space 100. This permits the clutch face 84 to be disengaged from the clutch disk 86 thus releasing the clutch 78.

Secured to the control shaft 52 above the mounting bracket 26 is a second cam follower assembly which is referred to in general by the reference numeral 102. The follower assembly 102 includes a mounting sleeve 104 which is secured on the control shaft 52 in an adjusted position by means of a setscrew 106. Formed integrally with the mounting sleeve 104 is a generally L-shaped arm 108 which carries a follower pin 110.

Referring now to Figure 4 in particular, it will be seen that the upper sleeve 38 is provided with an integral transversely extending boss 112 having an internally threaded bore 114. Carried by the boss 112 is a transverse shaft assembly which is referred to in general by the reference numeral 116.

The transverse shaft assembly 116 includes a tubular shaft 118 having a threaded end 120 threadedly engaged in the boss 112. The shaft 118 includes a nut portion 122 to facilitate the threading thereof into the boss 112 and to limit such threaded engagement. The shaft 118 includes a bore 124 in which there is driven a pin 126 having a head 128.

Rotatably journaled on the shaft 118 is a first cam which is referred to in general by the reference numeral 130. The cam 130, as is best illustrated in Figure 10, includes a hub 132 having a bore 134 receiving the shaft 118. Formed integrally with the hub 132 is a cam portion 136 having a cam surface 138 which is best illustrated in Figure 4. Also formed integrally with the hub 132 and extending normal to the axis of the bore 134 is a sleeve portion 140 having a bore 142. Adjustably received in the bore 142 is a brake control rod 144 which is retained in place by a setscrew 145.

Referring now to Figures 1 and 8 in particular, it will be seen that there is attached to the brake pedal 16 a connecting bracket 146. The connecting bracket 146 has a bore 148 in the forward end thereof which receives a threaded portion 150 of a fitting 152. The threaded portion 150 carries spherical resilient positioning elements 154 which are retained in place by a nut 156. The fitting 152 is in the form of a sleeve and is provided with an internally threaded bore 158. Adjustably threadedly engaged in the bore 158 is a threaded portion 160 of a link 162. The upper end of the link 162 is journaled in an enlarged portion 164 of the brake control rod 144. The connection between the cam 130 and the brake pedal 16 is such that when the cam 130 is rotated, the brake pedal 16 is depressed or released depending upon the direction of rotation of the cam 130.

Carried by the pin 126 immediately adjacent the cam 130 is a second cam which is referred to in general by the reference numeral 166. The cam 166, as is best illustrated in Figure 11, includes a hub 168 having a bore 170 therethrough receiving the pin 126. Formed integral with the hub 168 and extending outwardly therefrom is a cam arm 172 having a cam surface 174.

The hub 168 is provided with a bore 176 which extends transversely of the bore 170. Adjustably retained in the bore 176 is a control rod 178 for the accelerator pedal 14. The control rod 178 is retained in an adjusted position by means of a setscrew 180.

Referring now to Figures 1 and 7 in particular, it will be seen that there is clamped onto the accelerator pedal 14 by means of a clamp 182 a connecting arm 184. The forward end of the connecting arm 184 terminates in a ball 186. The forward end of the control arm 178 terminates in a similar ball 188. Extending between the balls 186 and 188 and snapped thereover is an adjustable accelerator link 190 of a conventional type having releasable connections for engaging the balls 186 and 188 and providing for a slight motion connection.

The cam follower assembly 66 is so positioned whereby when the handle 64 is in a neutral position, the roller 76 is aligned with the cam surface 138, but slightly out of engagement therewith. Further, the follower pin 110 is aligned with the cam surface 174, but slightly out of engagement therewith. When the handle 64 is pulled in one direction, the control shaft 52 is rotated to urge the follower pin 110 into engagement with the cam 166 to effect the depressing of the accelerator 14 and control the movement of the vehicle 10. When the control handle 64 is rotated in the opposite direction, the follower pin 110 moves out of engagement with the cam 166 and the roller 76 engages the cam 130 to effect the depressing of the brake pedal 16. Thus the brakes may be simultaneously applied with the releasing of the accelerator pedal. The reverse is also true when the brake is being released and the accelerator pedal is being actuated. When the roller 76 engages the cam 130, the components of the surface of the cam 130 engaged by the roller 76 includes a component disposed normal to the direction of the force of the spring 90 and the control shaft 52 is urged downwardly releasing the clutch 78. Otherwise, the clutch 78 has a tendency to hold the control shaft 52 in an adjusted position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft.

2. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft, said first and second cams having cam surfaces facing in opposite directions whereby one only of said cam surfaces is engaged at one time.

3. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft, a clutch between said mounting bracket and said control shaft for retaining said control shaft in a selected accelerator controlling position.

4. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft, a clutch between said mounting bracket and said control shaft for retaining said control shaft in a selected accelerator controlling position, said clutch including a clutch disk, a first clutch face on said mounting bracket, a second clutch face carried by said control shaft, said clutch disk being positioned between said clutch faces, said control shaft being longitudinally shiftable in said mounting bracket, spring means carried by said mounting bracket, normally urging said control shaft to a clutch disk clamping position.

5. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft, said first and second cams having cam surfaces facing in opposite directions whereby one only of said cam surfaces is engaged at one time, a clutch between said mounting bracket and said control shaft for retaining said control shaft in a selected accelerator controlling position.

6. A hand control for vehicle brakes and accelerator, said hand control comprising a mounting bracket, means on said mounting bracket for attachment to a vehicle steering column, a control shaft journaled in said mounting bracket for rotation, a transverse shaft carried by said mounting bracket, a first cam journaled on said transverse shaft, a brake control rod carried by said first cam, a second cam supported from said transverse shaft and journaled for rotation about the axis of said transverse shaft, an accelerator control rod connected to said second cam, and first and second cam followers carried by said control shaft for selectively engaging and rotating said first and second cams, respectively, upon rotation of said control shaft, a clutch between said mounting bracket and said control shaft for retaining said control shaft in a selected accelerator controlling position, said clutch including a clutch disk, a first clutch face on said mounting bracket, a second clutch face carried by said control shaft, said clutch disk being positioned between said clutch faces, said control shaft being longitudinally shiftable in said mounting bracket, spring means carried by said mounting bracket normally urging said control shaft to a clutch disk clamping position, said cam surface of said first cam having a component opposite to the direction of force applied by said spring means whereby said clutch is released when said first cam is actuated.

References Cited in the file of this patent
UNITED STATES PATENTS

| | | |
|---|---|---|
| 1,177,198 | MacGlashan | Mar. 28, 1916 |
| 1,521,746 | Belden | Jan. 6, 1925 |
| 2,309,796 | Snell | Feb. 2, 1943 |
| 2,320,878 | Manning | June 1, 1943 |